Jan. 30, 1945.  C. M. FULLER, JR  2,368,352

FEED MECHANISM FOR ENDLESS BELT CONVEYERS

Filed March 31, 1943

Inventor
Chas. M. Fuller Jr.

By
Attorneys

Patented Jan. 30, 1945

2,368,352

UNITED STATES PATENT OFFICE 2,368,352

FEED MECHANISM FOR ENDLESS BELT CONVEYERS

Charles M. Fuller, Jr., Lodi, Calif., assignor to Super Mold Corporation, Lodi, Calif., a corporation of California Application March 31, 1943, Serial No. 481,185

5 Claims. (Cl. 198—52)

This invention relates generally to an improved material feeding mechanism for an endless belt conveyer of the swinging or boom type which is mounted for vertical as well as horizontal swinging movement about corresponding axes adjacent the head end of the conveyer, and which type of conveyer is commonly used in connection with surface mining or dredging equipment.

An object of this invention is to provide a unique material feeding mechanism arranged to feed material onto the upper run of the conveyer adjacent the head thereof regardless of the vertical or horizontal angle of adjustment of said conveyer.

An additional object is to provide a feeding mechanism, as in the preceding paragraph, in which said mechanism is arranged to receive the material from a delivery point some distance ahead of and above the head end of the endless conveyer; this being an advantageous feature as it permits the use of an endless conveyer in connection with a mining machine or the like whose frame structure would prevent mounting of the conveyer with its head end in direct material-receiving position below said material delivery point.

An additional object of this invention is to provide a material feeding mechanism which comprises, in combination with the head end of a frame supported endless belt conveyer mounted for vertical and horizontal swinging movement about axes adjacent said end, a pan-like material chute disposed above, partly overhanging, and extending at an upward incline some distance ahead of the head end of said conveyer to a termination directly beneath a material delivery point, said chute feeding onto the upper run of the conveyer, means pivoting said chute adjacent its forward and lower end in connection with the conveyer frame for relative vertical movement, and other means relatively movably supporting said chute in generally said inclined position and so as to permit of horizontal adjustment of the conveyer.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
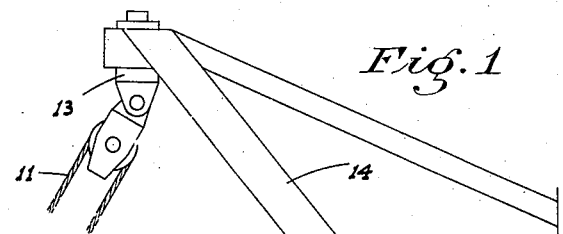
Figure 1 is a side elevation of the improved feeding mechanism as mounted in connection with the head end of an endless belt conveyer, and between said end of the conveyer and the discharge chute of a surface mining machine.

Referring now more particularly to the characters of reference on the drawing, the improved feeding mechanism is here shown as being arranged with the head end portion of a swinging or boom type endless conveyer 1, which includes a frame 2 supported closely adjacent its head end by laterally extending horizontal trunnions 3 which are mounted in connection with upstanding ears 4 carried by a fifth wheel assembly 5. As is apparent, the endless conveyer 1 can swing in a vertical plane about the trunnions 3 as an axis, and in a horizontal plane about the fifth wheel assembly 5 as an axis.

The head end of the endless conveyer 1 is supported, through the medium of the fifth wheel assembly 5, on a horizontal extension frame 6 which projects outwardly from the lower portion of the frame 7 of a surface mining machine or the like, indicated generally at 8. The machine 8 includes, within the frame thereof, an ore discharge chute 9 which extends at an outward and downward incline from a trommel 10 to a point of discharge disposed some distance ahead of and above the adjacent end of the conveyer 1. The conveyer is supported a substantial distance outwardly of its head end by means of a power actuated block and tackle unit, indicated generally at 11, and which block and tackle unit connects at its lower end with a swinging yoke which is pivoted to and straddles the frame of the endless conveyer. At its upper end the block and tackle unit is connected with a swivel head 13 which is mounted on the outer end of an overhanging A-frame 14 rigidly mounted on top of the mining machine; the vertical axis of the swivel head 13 being vertically alined with the corresponding axis of the fifth wheel assembly 5.

Figure 2:
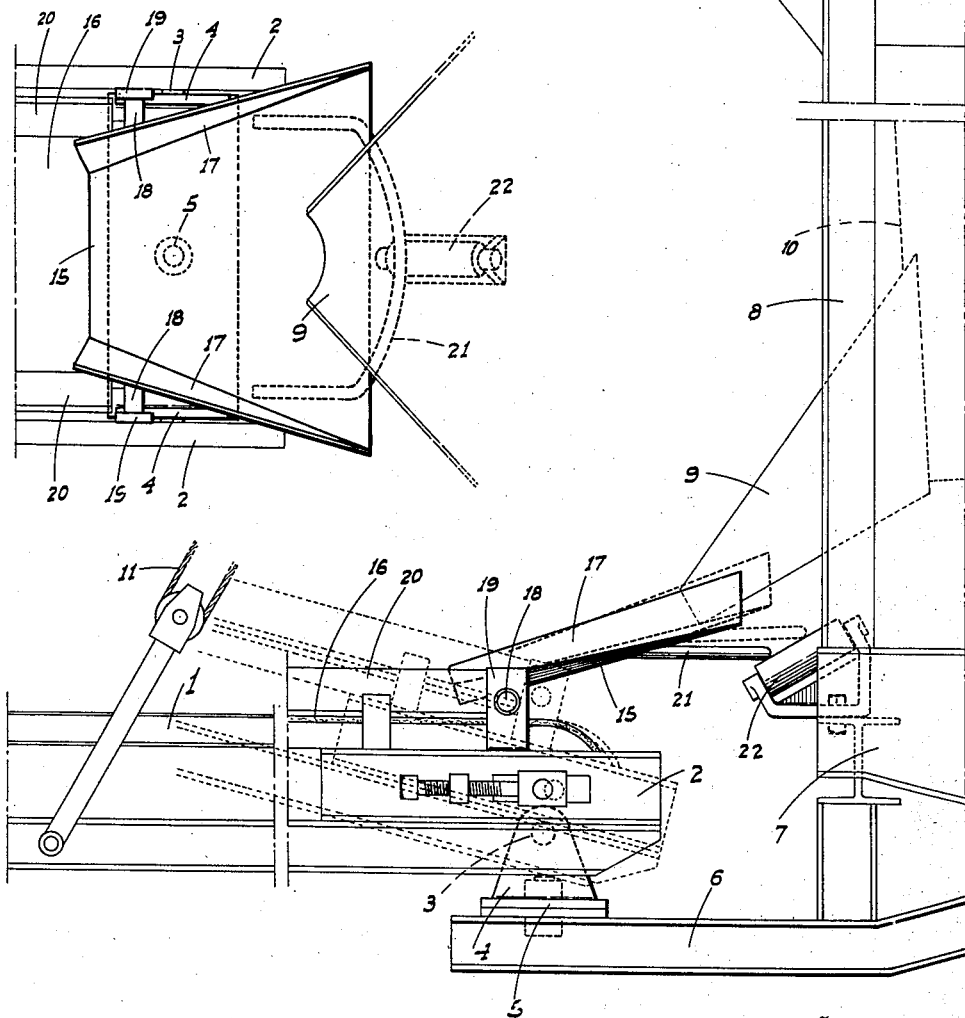
Figure 2 is a fragmentary plan view of the feeding mechanism.

In many mining machines, and as here shown, it is impossible to mount the conveyer 1 so that the chute 9 would discharge at all times onto the upper run of the conveyer and regardless of the vertical or horizontal angle of adjustment of said conveyer. To accomplish this end, the material feed mechanism which is the subject of this invention, is employed; such mechanism comprising the following:

A pan-like chute 15 of substantial length is disposed with one end portion thereof overhanging the upper reach 16 of the conveyer 1 adjacent the head end of the latter; said chute 15 extending at an upward incline to a termination at its upper end some distance ahead of and above the adjacent end of the conveyer, and in material receiving position adjacent and below the discharge end of chute 9. As clearly shown in Fig. 2, the chute 15 is of slightly less width at its lower end than the width of conveyer reach 16, and increases in width between said lower and its upper end; the sides of chute 15 being formed with upstanding and outwardly flaring material deflecting lips 17.

Adjacent its lower end the chute 15 is fitted on opposite sides with laterally projecting trunnions 18 which are journaled in rigid ears 19 which upstand from the conveyer frame 2, whereby the chute 15 and the conveyer 1 are mounted in relative vertical swinging relation, and so that the conveyer may, for example, swing from the position shown in full lines to the position shown in dotted lines in Fig. 1; vertical side plates 20 extending lengthwise along the sides of reach 16 forwardly from the ears 19 to prevent material from escaping laterally from said reach.

In order to permit the chute 15 to swing horizontally with the conveyer while maintaining generally the incline of said chute, a U-shaped supporting bar 21 is fixed on the under side of chute 15 intermediate its ends and projects horizontally some distance toward the machine frame 7; the portion of said bar between the legs thereof being arcuate, as shown, and concentric to the vertical axis of the fifth wheel assembly 5. This arcuate portion of the supporting bar 21 engages and rides on an inclined roller 22 mounted on the frame 7 of the mining machine, with its axis radially of the fifth wheel assembly 5. This roller is of substantial longitudinal extent and is inclined in generally the same direction as the incline of chute 15, but at a greater angle. By virtue of this arrangement the chute 15 can swing horizontally with the conveyer 1, while maintaining the desired incline, and additionally the vertical angle of the conveyer 1 can be adjusted without obstruction, as the resultant lengthwise movement of the chute 15 merely causes the bar 21 to ride further up the roller 22, as illustrated in dotted lines in Fig. 1.

In operation, material from the trommel 10 falls into chute 9, from which it discharges onto the chute 15 regardless of the vertical or horizontal angle of the conveyer and, as the chute 15 remains in substantially the same relation to the upper reach of the conveyer, material always flows from chute 15 cleanly onto said reach.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A material feeding mechanism for an endless conveyer mounted for vertical and horizontal swinging movement about corresponding axes closely adjacent the head end of said conveyer, said mechanism comprising a longitudinally extending, material feeding chute overhanging the head end of the conveyer and extending at an upward incline therefrom to a termination a distance ahead of and above said conveyer, means pivotally connecting said conveyer and chute for relative vertical swinging movement and other means horizontally movably supporting the chute at substantially said incline; said last named means comprising a horizontally arcuate bar mounted in a fixed transverse position in connection with and under the chute ahead of the adjacent end of the conveyer, and a roller fixedly mounted relative to the conveyer and chute and on which roller said arcuate bar rides in chute supporting relation, the roller being axially elongated and inclined in the same direction as the chute.

2. A material feeding mechanism as in claim 1 in which said horizontally arcuate bar is substantially concentric to the vertical axis of the conveyer.

3. A material feeding mechanism for an endless conveyer mounted for vertical and horizontal swinging movement about corresponding axes closely adjacent the head end of said conveyer, said mechanism comprising a longitudinally material feeding chute overhanging the head end of the conveyer and extending at an upward incline therefrom to a termination a distance ahead of and above said conveyer, said chute increasing materially and symmetrically in width from its lower to the upper end thereof, trunnions projecting laterally from opposite sides of the chute adjacent its lower end, ears fixed on and upstanding from the sides of the conveyer adjacent its head end, the trunnions being journaled in said ears, a horizontally arcuate transverse bar fixed in exposed position in connection with and under the chute ahead of the adjacent end of the conveyer and a roller fixedly mounted relative to the conveyer and chute and on which roller said arcuate bar rides in chute supporting relation, the roller being axially elongated and inclined in the same direction as the chute.

4. A material feeding mechanism as in claim 3 in which the roller is disposed with its axis radial of the vertical axis of the conveyer, and at a greater angle of incline than the chute.

5. A material feeding mechanism for an endless conveyer mounted for vertical and horizontal swinging movement about corresponding axes closely adjacent the head end of said conveyer, said mechanism comprising a longitudinally extending, material feeding chute overhanging the head end of the conveyer and extending at an upward incline therefrom to a termination a distance ahead of and above said conveyer, means pivotally connecting said conveyer and chute for relative vertical swinging movement and other means horizontally movably supporting the chute at substantially said incline, said last named means comprising an arcuate, downwardly exposed, transversely extending chute supporting element fixed on said chute ahead of the adjacent end of the conveyer, and a member fixed relative to the conveyer and chute and on which member said supported element rides in chute supporting relation.

CHARLES M. FULLER, Jr.